US009042673B2

(12) United States Patent
Cho et al.

(10) Patent No.: US 9,042,673 B2
(45) Date of Patent: May 26, 2015

(54) METHOD AND APPARATUS FOR DEBLURRING NON-UNIFORM MOTION BLUR IN LARGE SCALE INPUT IMAGE BASED ON TILE UNIT

(71) Applicants: SAMSUNG ELECTRONICS CO., LTD., Suwon-si, Gyeonggi-do (KR); POSTECH ACADEMY-INDUSTRY FOUNDATION, Pohang-si, Gyeongsangbuk-do (KR)

(72) Inventors: Jung Uk Cho, Hwaseong-si (KR); Seung Yong Lee, Pohang-si (KR); Young Su Moon, Seoul (KR); Shi Hwa Lee, Seoul (KR); Chi Young Lee, Pohang-si (KR); Sung Hyun Cho, Pohang-si (KR); Ho Jin Cho, Pohang-si (KR)

(73) Assignees: SAMSUNG ELECTRONICS CO., LTD., Suwon-Si (KR); POSTECH ACADEMY-INDUSTRY FOUNDATION POHANG UNIVERSITY OF SCIENCE AND TECHNOLOGY, Pohang-Si (KR)

( * ) Notice: Subject to any disclaimer, the term of this patent is extended or adjusted under 35 U.S.C. 154(b) by 151 days.

(21) Appl. No.: 13/793,319

(22) Filed: Mar. 11, 2013

(65) Prior Publication Data
US 2013/0243319 A1 Sep. 19, 2013

(30) Foreign Application Priority Data
Mar. 13, 2012 (KR) .................. 10-2012-0025623

(51) Int. Cl.
G06K 9/40 (2006.01)
G06T 5/00 (2006.01)
G06T 5/40 (2006.01)

(52) U.S. Cl.
CPC . G06T 5/003 (2013.01); G06T 5/40 (2013.01); G06T 2207/20021 (2013.01)

(58) Field of Classification Search
USPC ............... 382/168, 255; 348/208.1, 416.1
See application file for complete search history.

(56) References Cited

U.S. PATENT DOCUMENTS

2004/0233125 A1 11/2004 Tanghe et al.
2005/0286802 A1* 12/2005 Clark et al. ................ 382/286
(Continued)

FOREIGN PATENT DOCUMENTS

JP 2004-348132 12/2004
JP 2005-182056 7/2005
(Continued)

OTHER PUBLICATIONS

Lu Yuan et al., "Image Deblurring with Blurred/Noisy Image Pairs", pp. 1-9., Transactions on Graphics (TOG), 2007, (published before this application Mar. 2012).
Sunghyun Cho et al., "Fast Motion Deblurring", pp. 1-8., Transactions on Graphics (TOG), 2009, (published before this application Mar. 2012).
Qi Shan et al., "High-quality Motion Deblurring from a Single Image", *To appear in the ACM SIGGRAPH conference proceedings*, pp. 1-10. (Aug. 2008).
Moshe Ben-Ezra et al., "Motion Deblurring Using Hybrid Imaging", *Proceedings of the 2003 IEEE Computer Society Conference on Computer Vision and Pattern Recognition*, 2003, IEEE Computer Society, pp. 1-8, (published before this application Mar. 2012).
(Continued)

*Primary Examiner* — Chan Park
*Assistant Examiner* — Eueng-Nan Yeh
(74) *Attorney, Agent, or Firm* — Staas & Halsey LLP

(57) ABSTRACT

Provided is a method and apparatus for deblurring a non-uniform motion blur in an input image, that may restore a clearer image by dividing a large scale input image into tiles corresponding to partial areas, selecting, among the divided tiles, an optimal tile for a partial area most suitable for estimating non-uniform motion blur information, and effectively removing an artifact in an outer portion of a tile through padding of each tile.

24 Claims, 9 Drawing Sheets

(56) References Cited

U.S. PATENT DOCUMENTS

| | | | |
|---|---|---|---|
| 2008/0025627 A1* | 1/2008 | Freeman et al. | 382/255 |
| 2010/0166332 A1* | 7/2010 | Lee et al. | 382/255 |
| 2010/0266218 A1* | 10/2010 | Tezaur | 382/260 |
| 2011/0109755 A1* | 5/2011 | Joshi et al. | 348/208.5 |
| 2012/0051638 A1* | 3/2012 | Kawai et al. | 382/170 |

FOREIGN PATENT DOCUMENTS

| | | |
|---|---|---|
| JP | 2006-145890 | 6/2006 |
| KR | 2002-0032989 | 5/2002 |
| KR | 10-2004-0101088 | 12/2004 |
| KR | 10-0557733 | 2/2006 |
| KR | 10-2008-0047234 | 5/2008 |
| KR | 10-0860967 | 9/2008 |
| KR | 10-2011-0043991 | 4/2011 |
| KR | 10-2011-0093330 | 8/2011 |

OTHER PUBLICATIONS

Rob Fergus et al., "Removing Camera Shake from a Single Photograph", pp. 1-8., ACM SIGGRAPH, 2006, (published before this application Mar. 2012).

Qi Shan et al., "Rotational Motion Deblurring of a Rigid Object from a Single Image", International Conference on Computer Vision-ICCV,pp. 1-8, 2007, (published before this application Mar. 2012).

Alex Rav-Acha et al., "Two motion-blurred images are better than one", Pattern Recognition Letters 26, Dec. 9, 2004, pp. 311-317, (published before this application Mar. 2012).

Anat Levin et al., "Understanding and evaluating blind deconvolution algorithms", pp. 1-8., Computer Vision and Pattern Recognition, 2009. CVPR 2009. IEEE Conference, (published before this application Mar. 2012).

* cited by examiner

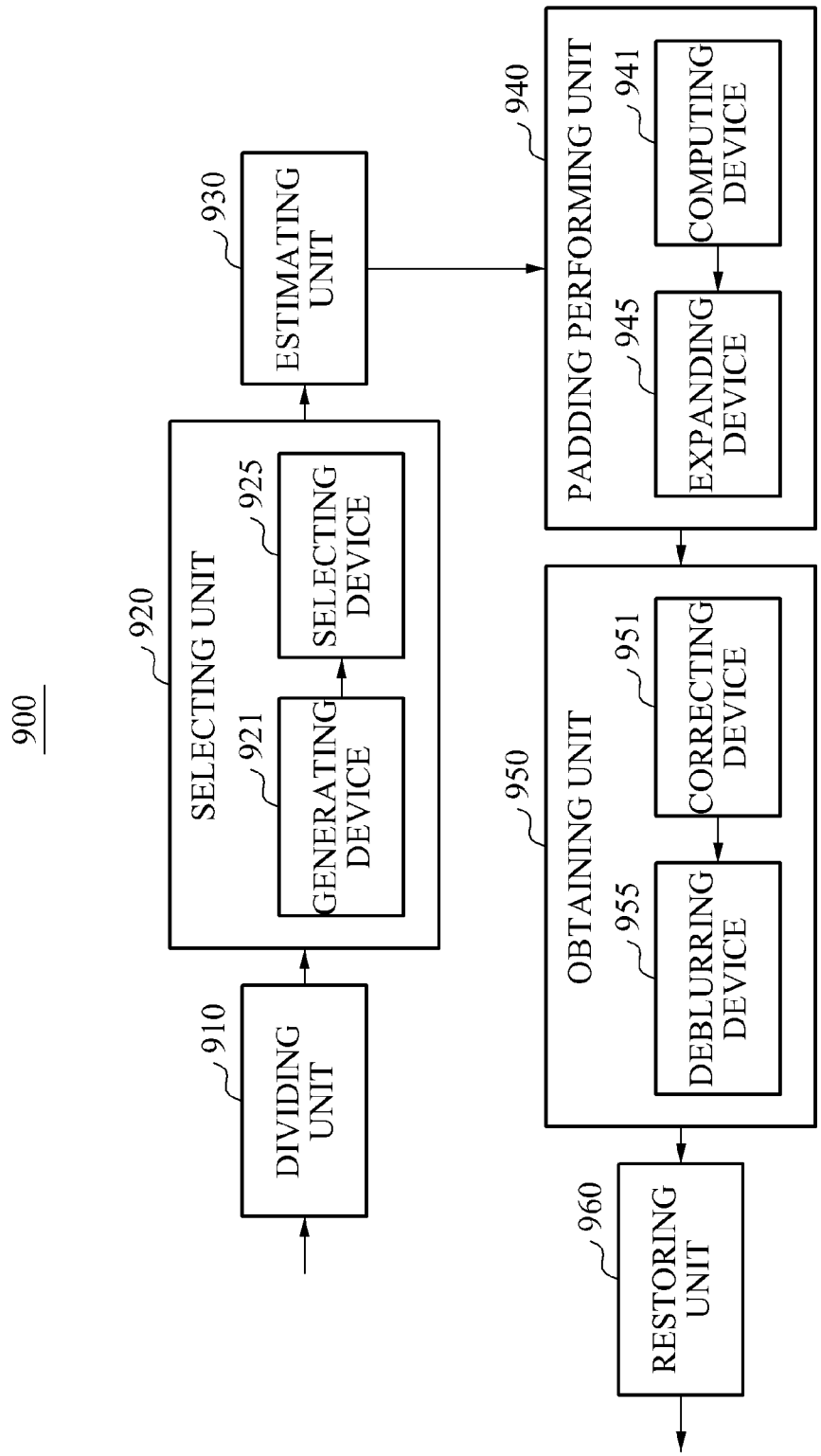

METHOD AND APPARATUS FOR DEBLURRING NON-UNIFORM MOTION BLUR IN LARGE SCALE INPUT IMAGE BASED ON TILE UNIT

CROSS-REFERENCE TO RELATED APPLICATIONS

This application claims the priority benefit of Korean Patent Application No. 10-2012-0025623, filed on Mar. 13, 2012, in the Korean Intellectual Property Office, the disclosure of which is incorporated herein by reference.

BACKGROUND

1. Field

One or more example embodiments relate to a method and apparatus for deblurring a non-uniform motion blur in a large scale image based on a tile unit.

2. Description of the Related Art

A blur is a phenomenon which commonly occurs during a process of obtaining an image while using an apparatus for obtaining an image such as photographing using a camera. The blur phenomenon is one of the main contributors to deterioration of image quality.

When an image is obtained using an apparatus, for example, a camera, and the like, in an environment where an amount of light is insufficient, for example, a dark indoor location, or an outdoor location in the evening, a sufficient amount of light is required to obtain a clear image. Accordingly, an image sensor may be exposed to light for a longer period of time than usual. However, when an exposure time is too long, blurring may occur in the obtained image due to the image sensor being shaken during the exposure time.

Removing blur from an image may be difficult since the amount of information required may be greater than an amount of information provided. In particular, each pixel of an image generally includes a non-uniform motion blur in different directions and of different magnitude due to a translational motion and a rotational motion of the camera. Information about such a non-uniform motion blur may be stored in pixel units, and may be processed. However, estimation of the information about the non-uniform motion blur may be difficult due to a limited capacity of a storage space used to process large scale images, which are photographed in a real daily life. Such large scale images may have a size greater than 10 megapixels.

SUMMARY

The foregoing and/or other aspects are achieved by providing a method of deblurring a non-uniform motion blur in an input image, the method including dividing the input image into a plurality of tiles having a predetermined size, selecting a single tile from the plurality of tiles, estimating non-uniform motion blur information of the selected tile by performing image registration, obtaining a latent image for each of the plurality of tiles, by deblurring a non-uniform motion blur based on the estimated non-uniform motion blur information, and restoring the input image using the obtained latent image.

The selecting may include generating a gradient histogram for each of the plurality of tiles based on a direction of edge pixels, included in each of the plurality of tiles, classified based on a number of the edge pixels and a gradient direction of the edge pixels, and selecting the single tile using the generated gradient histogram.

The generating may include generating a gradient map for each of the plurality of tiles, determining edge pixels based on a gradient magnitude of the gradient map, classifying the determined edge pixels based on the gradient direction, and generating a gradient histogram for each of the plurality of tiles, based on the classified edge pixels.

The selecting may include verifying a number of edge pixels included in each gradient direction, with respect to each of the plurality of tiles, using the generated gradient histogram, and selecting the single tile based on the verified number of edge pixels.

The obtaining may include correcting the estimated non-uniform motion blur information to match pixel coordinates corresponding to a relevant position in the input image, and deblurring the non-uniform motion blur, using the corrected non-uniform motion blur information as non-uniform motion blur information for each of the plurality of tiles.

The input image may correspond to at least one of a single frame including the non-uniform motion blur, a multi-frame including the non-uniform motion blur, and a multi-frame including a single blurred image including the non-uniform motion blur and a single noise image in which a blur is absent.

The obtaining may include deblurring the non-uniform motion blur using a conjugate gradient method when the input image corresponds to one of the single frame including the non-uniform motion blur and the multi-frame including the non-uniform motion blur.

The obtaining may include deblurring the non-uniform motion blur using the Richardson-Lucy (RL) deconvolution algorithm when the input image corresponds to the multi-frame including the single blurred image including the non-uniform motion blur and the single noise image in which the blur is absent.

The method may further include performing padding on a boundary portion of each of the plurality of tiles.

The performing of the padding may include computing a size of a pad to be added for each of the plurality of tiles, based on the estimated non-uniform motion blur information and positional information of a pixel corresponding to each of the plurality of tiles, and expanding a size of each of the plurality of tiles to the computed size of the pad to be added.

The size of the pad to be added may be computed based on a pixel distance by which pixels constituting each of the plurality of tiles may be displaced due to a blur.

The obtaining may include obtaining the latent image by deblurring the non-uniform motion blur in each of the plurality of tiles of which size is expanded by the size of the pad to be added.

The foregoing and/or other aspects are achieved by providing an apparatus for deblurring a non-uniform motion blur in an input image, the apparatus including a division unit to device the input image into a plurality of tiles having a predetermined size, a selecting unit to select a single tile from the plurality of tiles, an estimating unit to estimate non-uniform motion blur information of the selected tile by performing image registration, an obtaining unit to obtain a latent image for each of the plurality of tiles, by deblurring a non-uniform motion blur based on the estimated non-uniform motion blur information, and a restoring unit to restore the input image using the obtained latent image obtained.

The selecting unit may include a generating device to generate a gradient histogram for each of the plurality of tiles based on a direction of edge pixels, included in each of the plurality of tiles, classified based on a number of the edge pixels and a gradient direction of the edge pixels, and a selecting device to select the single tile using the generated gradient histogram.

The obtaining unit may include a correcting device to correct the estimated non-uniform motion blur information to match pixel coordinates corresponding to a relevant position in the input image, and a deblurring device to deblur the non-uniform motion blur, using the corrected non-uniform motion blur information as non-uniform motion blur information for each of the plurality of tiles.

The input image may correspond to at least one of a single frame including the non-uniform motion blur, a multi-frame including the non-uniform motion blur, and a multi-frame including a single blurred image including the non-uniform motion blur and a single noise image in which a blur is absent.

The apparatus may further include a padding performing unit to perform padding on a boundary portion of each of the plurality of tiles.

The padding performing unit may include a computing device to compute a size of the pad to be added for each of the plurality of tiles, based on the estimated non-uniform motion blur information and positional information of a pixel corresponding to each of the plurality of tiles, and an expanding device to expand a size of each of the plurality of tiles by the computed size of the pad to be added.

The obtaining unit may obtain the latent image by deblurring the non-uniform motion blur in each of the plurality of tiles of which a size is expanded by the size of the pad to be added.

The foregoing and/or other aspects are achieved by providing a method of deblurring an input image. The method includes estimating non-uniform motion blur information of a single tile of a plurality of tiles of the input image by performing image registration, and obtaining a latent image for each of the plurality of tiles, by deblurring a non-uniform motion blur of the single tile based on the estimated non-uniform motion blur information of the single tile.

The foregoing and/or other aspects are achieved by providing a method of restoring an input image divided into a plurality of tiles. The method includes performing padding on a boundary portion of a tile of the plurality of tiles based on estimated non-uniform motion blur information of a single tile of the plurality of tiles and positional information of a pixel corresponding to each of the plurality of tiles, wherein the non-uniform motion blur information is estimated by performing image registration.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 9 illustrates an apparatus for deblurring a non-uniform motion blur in a large scale image based on a tile unit according to example embodiments.

DETAILED DESCRIPTION

Figure 1:
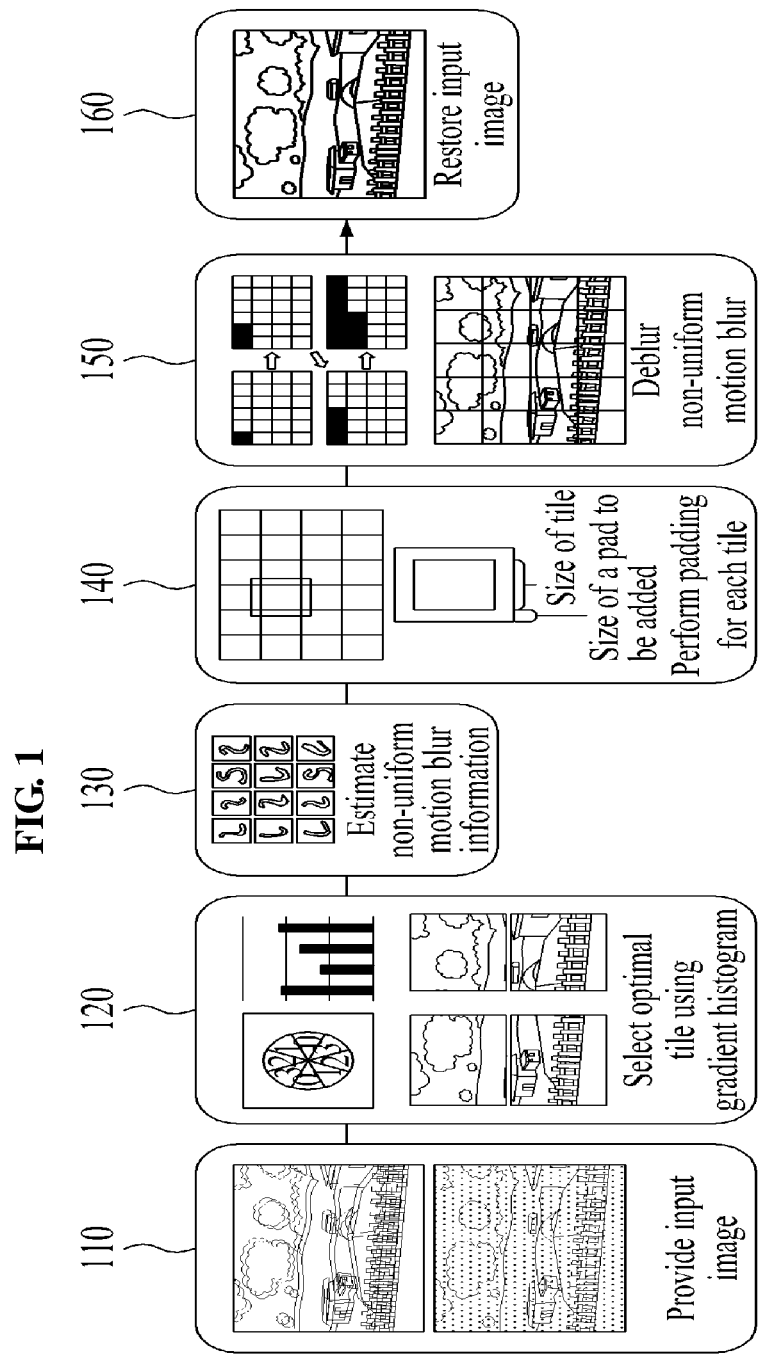
FIG. 1 is provided to describe a method of deblurring a non-uniform motion blur in a large scale image based on a tile unit according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a method of deblurring a non-uniform motion blur in a large scale image based on a tile unit according to example embodiments.

Referring to FIG. 1, when a large scale input image is provided in operation 110, an apparatus for deblurring a non-uniform motion blur, hereinafter, a deblurring apparatus, may divide the input image into a plurality of tiles having a relatively small size with respect to the input image and obtain a gradient map for each of the tiles.

In this instance, the size of the plurality of tiles and a number of the plurality of tiles may be variable depending on a size of the input image.

In operation 120, the deblurring apparatus may generate a gradient histogram for each of the plurality of tiles by measuring a number of edge pixels based on a gradient direction, and may select an optimal tile using the generated gradient histogram.

In this instance, by comparing gradient histograms for each of the plurality of tiles, the deblurring apparatus may select a tile having various edge directions and including a great number of edge pixels to be the optimal tile.

In operation 130, the deblurring apparatus may estimate non-uniform motion blur information of the selected optimal tile, by performing image registration. In this instance, the estimated non-uniform motion blur information may be corrected to match pixel coordinates corresponding to a relevant position in the input image, and may be used as blur information, for example non-uniform motion blur information, for the entire image.

In operation 140, the deblurring apparatus may perform padding on a boundary portion of each of the plurality of tiles, in order to remove an artifact in an outer area of each of the plurality of tiles. In this instance, the deblurring apparatus may perform the padding, by computing a size of a pad to be added based on the estimated blur information and positional information of a pixel corresponding to each of the plurality of tiles.

In operation 150, the deblurring apparatus may deblur a non-uniform motion blur sequentially, with respect to each of the plurality of tiles corresponding to a partial area of the input image. In this instance, when the input image corresponds to a multi-frame or a single frame including a non-uniform motion blur, a latent image may be obtained by resolving Equation 7, which will be described later, using a conjugate gradient method.

When the input image corresponds to a multi-frame including a single blurred image and a single noise image, a deblurred latent image may be obtained using the Richardson-Lucy (RL) deconvolution algorithm corresponding to Equation 11 and Equation 12, which will be described later.

When a latent image for each of the plurality of tiles is obtained as a result of operation 150, the deblurring apparatus may restore a final clear large scale input image by putting the plurality of tiles together, in operation 160.

Hereinafter, the method of deblurring the non-uniform motion blur in the large scale input image based on a tile unit will be described in detail.

Generally, a non-uniform motion blur that is shaken by a projective transformation of a camera may be expressed by Equation 1.

$$b = \sum_i w_i P_i l + n \quad \text{[Equation 1]}$$

In Equation 1, b, l, and n denote vector expressions of a blurred image including a blur, a latent image, and an unknown noise occurring during a process of obtaining an image, respectively. $P_i$ denotes a determinant representing a projective transform motion of a camera at a point in time $t_i$, and $w_i$ denotes a relative length of time when the camera stops at the point in time $t_i$, that is, an exposure time of the camera at the point in time $t_i$. Here, $\Sigma_i w_i = 1$.

Equation 1 may indicate that the blurred image b may be expressed using a sum of clear images I at each coordinate and each viewpoint on a route of the camera.

In the method of deblurring the non-uniform motion blur in the large scale image based on the tile unit, blind motion deblurring may be performed by applying Equation 1. Generally, in the blind motion deblurring, the latent image I and the non-uniform motion blur information $P_i$ and $w_i$ may be computed, using only the input blurred image b.

However, according to example embodiments, the input image may have various forms, for example, a single frame including the non-uniform motion blur, a multi-frame including the non-uniform motion blur, and a multi-frame including a single blurred image and a single noise image in which a blur is absent. Accordingly, a final clear latent image I and final non-uniform motion blur information $P_i$ and $w_i$ may be computed, using input images of different forms.

The method of deblurring the non-uniform motion blur in the input image may be classified into estimation of non-uniform motion blur information $P_i$ and $w_i$ that may satisfy Equation 1, and obtaining of a latent image I using the estimated non-uniform motion blur information $P_i$ and $w_i$, with respect to a blurred image. The estimation and the obtaining may be performed by optimization through an iterative process.

Here, the optimization through the iterative process may be performed to progressively refine accuracy of P and w including the non-uniform motion blur information. A final deblurred latent image may be obtained using finally computed non-uniform motion blur information P and w, and the input blurred image b including the non-uniform motion blur.

An intermediate latent image, estimated during an optimizing process of performing the estimation of the non-uniform motion blur information and the obtaining of the latent image, iteratively, may not have a direct effect on a deblurred and restored input image. However, the estimated intermediate latent image may have an effect on the estimation of the non-uniform motion blur information P and w, thereby affecting the deblurred latent image, indirectly.

Hereinafter, a process of estimating non-uniform motion blur information will be described.

The process of estimating the non-uniform motion blur information may be performed using image registration. The estimating process may include a process of estimating a homography P indicating the non-uniform motion blur, and a process of computing a weight w of the corresponding homography P.

In the process of estimating the non-uniform motion blur information, when an intermediate latent image I is provided, the homography P indicating the non-uniform motion blur may be computed. In order to compute the homography P, Equation 1 may be rearranged to obtain Equation 2.

$$b - \sum_{j \neq i} w_j P_j l = w_i P_i l + n \quad \text{[Equation 2]}$$

In order to compute a single homography P, in Equation 2, the homography $P_i$ minimizing a difference between $$b - \sum_{j \neq i} w_j P_j l$$

of the left side and $w_i P_i l$ of the right side may be computed by applying an image registration algorithm. In order to compute the entire homography set P, all homographies may be computed by selecting a homography $P_i$ individually.

When the entire homography set P is computed, a weight w of a homography may be computed using the computed entire homography set P.

In order to compute the weight w, Equation 2 may be expressed as Equation 3.

$$b = Lw + n \quad \text{[Equation 3]}$$

In Equation 3, $L=[P_1 l\ P_2 l \ldots P_m l]$, and L denotes an m-by-n (m×n) matrix. Here, m denotes a number of pixels included in an image, and n denotes a number of homographies.

Generally, m>>n, and the weight w in Equation 3 may need to have a value greater than or equal to '0.' Accordingly, a non-negative least square method may be used to compute the weight w.

In order to use the non-negative least square method, Equation 3 may be expressed in a form of a normal equation, as shown in Equation 4.

The weight w may be computed using Equation 4.

$$w = (L^T L + \beta I)^{-1} L^T b. \quad \text{[Equation 4]}$$

In Equation 4, β denotes a normalized parameter to be used for resolving a case in which an inverse matrix of a determinant in parenthesis is absent. I denotes an identity matrix.

In a case of a projective transform motion blur model that is assumed when the input image corresponds to a multi-frame including a non-uniform motion blur, or a multi-frame including a blurred image and a noise image, both the method of estimating the homography and the method of estimating the weight may be used.

However, the method of estimating the non-uniform motion blur information may be unperformable with respect to a large scale image having a size of 10 megapixels, due to a limited capacity of a storage space, that is, a memory.

For example, it may be assumed that a number of homography samples to be estimated may correspond to 64, and a size of an image may correspond to 10 megapixels.

In order to compute the left side of Equation 2, when multiplication of all of a number of pixels in the entire image, a number of estimated homographies, a number of bytes required to perform a floating point operation, and a number of channels required for processing a color image is performed, a temporary storage space having a size greater than or equal to about 7 gigabytes may be required. When the number of the homographies to be estimated increases, or when the size of the input image increases, the capacity of the temporary storage space may increase proportionately. Accordingly, the estimation of the non-uniform motion blur information with respect to the large scale image may not be computed using the entire image at once. Instead, the non-uniform motion blur information with respect to the entire image may be estimated by limiting a partial area of the image.

As shown in FIG. 1, in order to estimate the non-uniform motion blur information, the entire image may be divided into a plurality of tiles corresponding to partial areas of small units, and an optimal tile which is most advantageous to the estimation of the blur information may be selected. An optimized homography P and weight w corresponding to a currently provided latent image I may be computed through iterative resolutions of Equation 2 and Equation 4.

In this instance, image registration that is used for the estimation of the non-uniform motion blur information may be sensitive to edge information of the image. Accordingly, a tile having various edge directions and including a great number of edge pixels may be determined to be the optimal tile, among all of the plurality of tiles constituting the input image.

A method of determining the optimal tile will be described herein.

After a gradient map for each of the plurality of images is generated, pixels having values greater than or equal to a predetermined gradient threshold based on a gradient magnitude of the generated gradient map may be regarded as edge pixels. The pixels regarded as the edge pixels may be classified, based on a gradient direction, as one of four directions, for example, an up and down direction, a left and right direction, a diagonal direction, and another diagonal direction perpendicular to the diagonal direction.

Upon completion of the classification based on the gradient magnitude and the gradient direction, a gradient histogram for each of the plurality of tiles may be generated based on the classification.

A number of edge pixels included in the four gradient directions may be verified and recorded for each tile. In this instance, in order to select a tile having various edge directions and including a great number of edge pixels, a number of pixels in a direction classified as including a minimum number of pixels may be recorded, among gradient histograms for the plurality of tiles. Here, the number of pixels in the direction classified as including the minimum number of pixels may refer to a number of edge pixels in a direction in which a smallest number of edge pixels are included in each of the plurality of tiles.

By comparing numbers of pixels in a direction classified as including a minimum number of pixels, with respect to each of the plurality of tiles constituting the input image, a tile having a greatest number of pixels may be determined to be the optimal tile. Non-uniform motion blur information P and w obtained with respect to a partial area determined to be the optimal tile may be corrected through a translational motion corresponding to pixel coordinates corresponding to a relevant position in the input image. The corrected non-uniform motion blur information may be used as non-uniform motion blur information for the entire image.

In this instance, the estimation of the non-uniform motion blur information P and w may be performed iteratively at every time when the latent image I is updated. Through the iterative process, the optimized latent image I and the non-uniform motion blur image P and w corresponding to the optimized latent image I may be computed.

The process of obtaining the latent image will be described.

The latent image I may be computed using the estimated non-uniform motion blur information P and w, and the input image of various forms, for example, a single frame including a non-uniform motion blur, a multi-frame including a non-uniform motion blur, a multi-framing including a single blurred image and a single noise image, and the like.

In particular, when the non-uniform motion blur is to be deblurred by receiving an input of the single frame or the multi-frame, the latent image I may be computed by resolving Equation 5.

$$\operatorname*{argmin}_{l} \left\| b - \sum_{i} w_i P_i l \right\|^2 + \lambda_1 P_1(l): \qquad \text{[Equation 5]}$$

In Equation 5, $P_1(l) = (\|D_x l\|_\alpha)^\alpha + (\|D_y l\|_\alpha)^\alpha$, denotes a weight for $P_l$. $\|x\|_\alpha$ denotes an L-$\alpha$ norm of a vector.

Since a flat region occupies a larger portion than a clear edge region in a general nature image, it may be important to restrain noise in the flat region. Also, it may be important to effectively restore a clear edge. According to example embodiments, sparseness prior may be used to resolve the foregoing problem. In this instance, $\alpha = 0.8$.

In Equation 5, the latent image I may be computed by an iterative reweighted least square method, and may be computed by approximating a normalized term as expressed by Equation 6.

$$\operatorname*{argmin}_{l} \left\| b - \sum_{i} w_i P_i l \right\|^2 + l^T D_x^T W_x D_x l + l^T D_y^T W_y D_y l \qquad \text{[Equation 6]}$$

In Equation 6, $W_x$ and $W_y$ denote diagonal matrices. A $k^{th}$ diagonal element of $W_x$ corresponds to $\lambda_1 |D_x l(k)|^{\alpha-2}$, and a $k^{th}$ diagonal element of $W_y$ corresponds to $\lambda_l |D_y l(k)|^{\alpha-2}$. $D_x l$ (k) denotes a $k^{th}$ element of a vector $D_x l$, and $D_y l(k)$ denotes a $k^{th}$ element of a vector $D_y l$.

In order to compute the latent image I by resolving Equation 6, the conjugate gradient method may be applied to Equation 7.

$$(Q^T Q + D_x^T W_x D_x + D_y^T W_y D_y) l = Q^T b \qquad \text{[Equation 7]}$$

In Equation 7, $$Q = \sum_{i} w_i P_i.$$

The foregoing model may correspond to a model in a case where a blurred image b is a single frame. The model may require a process of predicting the latent image I in the operation of estimating the non-uniform motion blur information using the image registration algorithm based on Equation 4. Here, the latent image used for the estimation of the non-uniform motion blur information may directly influence a performance of the image registration algorithm, and also may influence quality of deblurring results. It may be difficult to stably provide an appropriate clear image by the method described above. Accordingly, in the method of deblurring the non-uniform motion blur using the multi-frame, a remaining blurred image may be provided as an initial value of the clear image I with respect to the blurred image.

When the input image corresponds to the multi-frame including the non-uniform motion blur, each image of the multi-frame may be used as an initial value of a latent image for estimating blur information for the other image, during a first iteration of the iterative process of estimating the non-uniform motion blur information, whereby accuracy of the estimation of the blur information may be increased. Also, from a second iteration, non-uniform motion blur information for each image of the multi-frame may be estimated, using a latent image in which a non-uniform motion blur estimated during a previous iteration may be deblurred.

In the method of deblurring the non-uniform motion blur in the input image, quality of the latent image may be improved by deblurring a blur using at least two images by expanding Equation 5.

In order to expand Equation 5 so that the multi-frame is used, Equation 5 may be changed as expressed by Equation 8.

$$\operatorname*{argmin}_{l} \sum_{k} \left\| b_k - \sum_{i} w_{(k,i)} P_{(k,i)} l \right\|^2 + \lambda_1 P_1(l) \quad \text{[Equation 8]}$$

In Equation 8, $P_{(k,i)}$ denotes an $i^{th}$ homography of a $k^{th}$ image $B_k$ including a non-uniform motion blur, and $w_{(k,i)}$ denotes an $i^{th}$ weight of the $k^{th}$ image $B_k$ including the non-uniform motion blur.

When the non-uniform motion blur is to be deblurred using the multi-frame including the non-uniform motion blur, it may be assumed that each image of the multi-frame includes different non-uniform motion blur information. Since it may be unnecessary to expect a clear image, non-uniform motion blur information may be estimated and removed more stably.

When the non-uniform motion blur is to be deblurred by receiving an input of the multi-frame including the single blurred image including a non-uniform motion blur and the noise image in which a blur is absent, a latent image I may be computed using the estimated non-uniform motion blur information P and w, the input blurred image b, and the input noise image $I_N$.

The latent image I may be expressed by a sum of the image $N_D$ from which the noise is removed, and a residual latent image $\Delta l$ including original clear edge information, as expressed by Equation 7.

$$l = N_D + \Delta l \quad \text{[Equation 9]}$$

In Equation 9, the residual latent image $\Delta l$ denotes clear information of an image that may disappear during a process of removing the noise.

Using Equation 1 and Equation 9, a non-uniform motion blur $\Delta b$ in the residual latent image $\Delta l$ may be expressed by Equation 10.

$$\Delta b = \sum_{i} w_i P_i \Delta l + n \quad \text{[Equation 10]}$$

When the multi-frame including the single blurred image and the single noise image is received, the residual latent image $\Delta l$ may be computed by resolving Equation 10 using the RL deconvolution algorithm.

The RL deconvolution algorithm using a residual blurred image may be expanded suitably for the non-uniform motion blur, and may be used. A ringing artifact that may cause deterioration of image quality may be reduced by performing the deconvolution on the residual latent image.

A latent image $\Delta l$ may be computed during each iteration, using Equation 11.

$$\Delta l_{n+1} = \left( \sum_{i} w_i P_i^T \frac{\Delta B + l}{\sum_{i} w_i P_i (\Delta l_n + 1)} \right) \cdot (\Delta l_n + l) - l \quad \text{[Equation 11]}$$

In Equation 11, $P^T$ denotes a homography transformed by applying an inverse of a homography P.

The final clear image I may be obtained by adding the image $N_D$ from which the noise is removed and the residual latent image $\Delta l$ is obtained by resolving Equation 11.

However, the residual latent image $\Delta l$ obtained as a result of resolving Equation 11 may include a clear image and a little ringing artifact. That is, the ringing artifact may be reduced, however, the ringing artifact may not be eliminated completely. Accordingly, a more refined Gain-Controlled RL deconvolution algorithm may be used as well. A residual latent image $\Delta l$ obtained by an iteration process of the Gain-Controlled RL deconvolution may be computed, using Equation 12.

$$\Delta l_{n+1} = I_{gain} \cdot \left\{ \left( \sum_{i} w_i P_i^T \frac{\Delta B + l}{\sum_{i} w_i P_i (\Delta l_n + l)} \right) \cdot (\Delta l_n + l) - l \right\} \quad \text{[Equation 12]}$$

In Equation 12, $I_{gain}$ may be obtained, as expressed by Equation 13.

$$I_{gain} = (1 - \alpha) + \alpha \sum_{l} \| \nabla N_D^l \| \quad \text{[Equation 13]}$$

In Equation 13, $\alpha$ denotes a variable for controlling an effect of a gain map. $\nabla N_D^l$ denotes an image of a first stage in a pyramid when a gradient of an image from which noise is removed is blurred using a Gaussian pyramid with a standard deviation of 0.5. Although a value of $\alpha$ in Equation 13 may correspond to a predetermined value between 0 and 1, a value of 0.2 may be generally used.

As a result of the Gain-Controlled RL deconvolution of Equation 12, a smoother resulting image may be obtained when compared to the RL deconvolution of Equation 11, and the resulting image may be used to remove the ringing artifact.

The result of Equation 11 and the result of Equation 12 may be complementarily used with each other. An image mainly including only a ringing artifact may be obtained by applying both the result of the RL deconvolution of Equation 11 and the result of the Gain-Controlled RL deconvolution of Equation 12 to a joint bilateral filter. A clear residual latent image in which the ringing artifact is absent may be obtained by subtracting the image mainly including only the ringing artifact from the result of the RL deconvolution of Equation 11. A final clear latent image may be obtained by adding the residual latent image in which the ringing artifact is absent to the result of the Gain-Controlled RL deconvolution of Equation 12.

Similar to the process of estimating the non-uniform motion blur information with respect to the large scale image, there may be a limitation to an actual performance environment when a large scale image is provided, in the process of obtaining the latent image, by which the clear image I may be obtained by deblurring the non-uniform motion blur.

When the multi-frame is received in the process of obtaining the latent image, it may be assumed that Equation 7 may be computed using a conjugate gradient method.

In this instance, a temporary storage space corresponding to a result of multiplying all of a number of pixels in an image, a number of estimated homographies, a number of bytes used for a floating point operation, and a number of channels of a color image. Accordingly, when it is assumed that a size of the image may be greater than or equal to 10 megapixels, and a number of estimated homographies may correspond to 64, a storage space greater than or equal to about 7 gigabytes may be required.

When the multi-frame including the single blurred image and the single noise image is received, the process of computing Equation 11 for the RL deconvolution, and the process of computing Equation 12 for the Gain-Controlled RL deconvolution may require a temporary storage space greater than or equal to about 7 gigabytes, similar to the process of computing Equation 7. When the size of the input image increases, a capacity of the required temporary storage space may increase proportionately.

Accordingly, the operation 150 of deblurring the non-uniform motion blur in the large scale image may not be performed using the entire image at once. Instead, the deblurring of the non-uniform motion blur may be performed sequentially with respect to a partial area of a size suitable for a performance environment.

A method of deblurring a non-uniform motion blur in a large scale image based on a tile unit will be described.

Non-uniform motion blur information P and w of the entire image estimated through the operation 120 of selecting the optimal tile may be corrected using a translational motion corresponding to pixel coordinates corresponding to a relevant position in the input image of each tile.

The non-uniform motion blur may be deblurred using the corrected non-uniform motion blur information P' and w as non-uniform motion blur information for each of the plurality of tiles.

The non-uniform motion blur information P' corrected based on the position of the original image of the tile may be computed using Equation 14.

$$P' = \begin{bmatrix} 1 & 0 & -u \\ 0 & 1 & -v \\ 0 & 0 & 1 \end{bmatrix} P \begin{bmatrix} 1 & 0 & u \\ 0 & 1 & v \\ 0 & 0 & 1 \end{bmatrix}$$ [Equation 14]

In Equation 14, u and v denote pixel coordinates in the original image of the tile from which a blur is desired to be deblurred, and P denotes a homography estimated with respect to the entire image.

Deblurring may be performed independently with respect to a tile of a relatively small size, using new blur information corrected to match the pixel coordinates in the original image of the tile, that is, the corrected non-uniform motion blur information P'. By putting deblurred clear tiles together after the deblurring has been performed, deblurring of the non-uniform motion blur in the large scale image, which may be unperformable using the entire image at once due to the relatively large size of the entire image, may be performed effectively.

Figure 7:
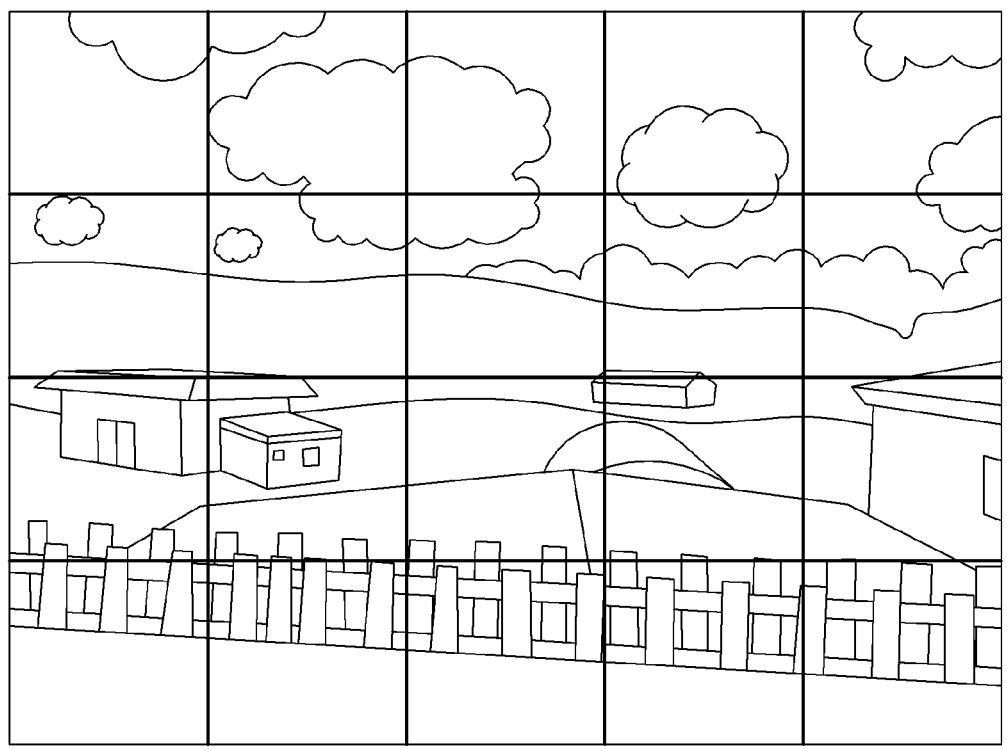
FIG. 7 illustrates a result of deblurring a blur without performing padding in a method of deblurring a non-uniform motion blur in an input image according to example embodiments.

However, when the deblurring is performed by simply dividing the entire image into tiles corresponding to a plurality of partial areas, an artifact may occur in a boundary portion of a tile, as shown in FIG. 7. The artifact may occur since neighboring pixels used to restore a single pixel of the tile are included in another partial area of the image, rather than the corresponding tile, and required pixel information may be unavailable.

Accordingly, by performing padding to add a pad having a size marginally greater than a size of the tile, a clear image in which a boundary artifact is absent may be obtained in an internal portion of the tile, excluding a padding area, when the non-uniform motion blur is deblurred.

Here, padding may refer to a process of expanding a size of a tile to be used for deblurring, by adding an area of a predetermined size to the provided tile, upwards, downwards, leftwards, and rightwards, that is in any and all potential directions.

In an embodiment, determination of the size of the pad to be added may be important. The size of the pad to be added may be sufficiently great so as to prevent an artifact from occurring around a boundary of the tile. Also, the size of the pad to be added may be determined to be as small as possible so that a limitation of a capacity of a temporary storage space may not occur, and a processing time to be increased due to the padding may be minimized.

In view of the aforementioned descriptions, an optimal size of the pad to be added may be computed, based on the pixel coordinates in the original image of the provided tile, and the blur information P' and w that is corrected to match the pixel coordinates of the tile, as expressed by Equation 15.

$$s = \max(\|P'x_i - x_i\|_2^2)$$ [Equation 15]

In Equation 15, $x_i = (u_i, v_i)_{i=1,2,3,4}$. s denotes a size of a pad to be added for each tile, P' denotes blur information corrected with respect to pixel coordinates of a tile in the original image, and $x_i$ denotes pixel coordinates of four corner pixels that are positioned in an upper left end, an upper right end, a lower left end, and a lower right end of the tile, respectively, in the original image.

Figure 8:
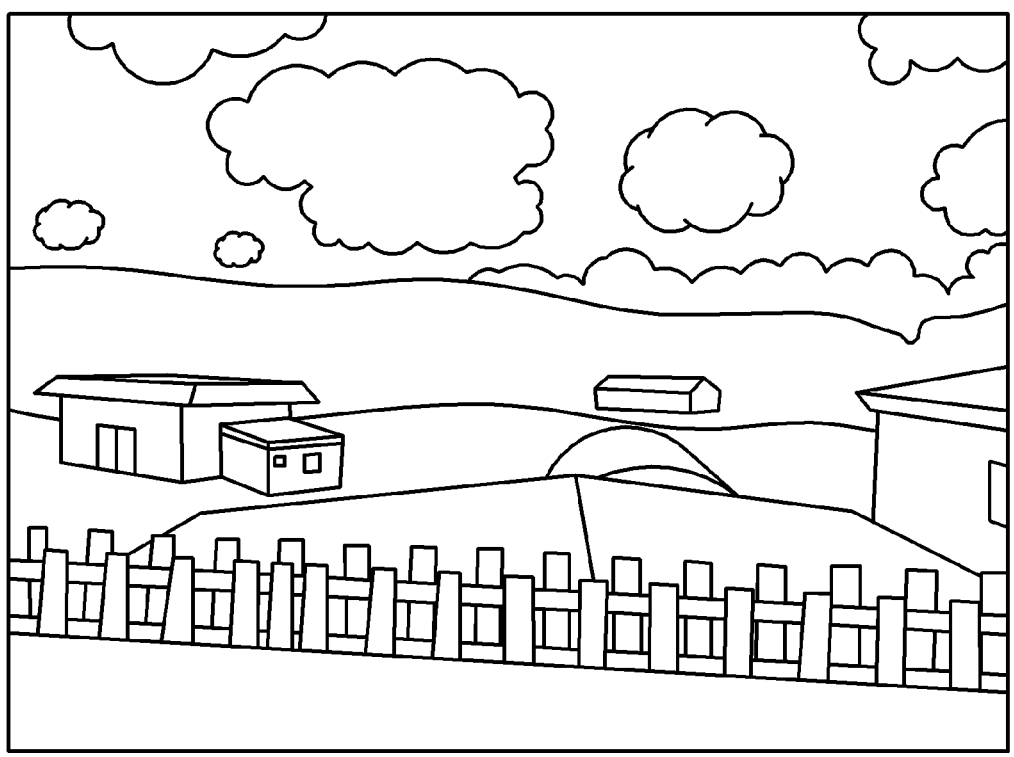
FIG. 8 illustrates a result of deblurring a blur by performing padding in a method of deblurring a non-uniform motion blur in an input image according to example embodiments.

That is, in Equation 15, the size of the pad to be added to each tile may be computed based on a maximum pixel distance by which pixels constituting the tile may be displaced due to a blur. When the size of the tile is expanded by the computed size of the pad to be added, and a non-uniform motion blur is deblurred for each tile, a deblurred clear image in which an artifact in a boundary portion of the tile is absent may be obtained, as shown in FIG. 8.

Figure 2:
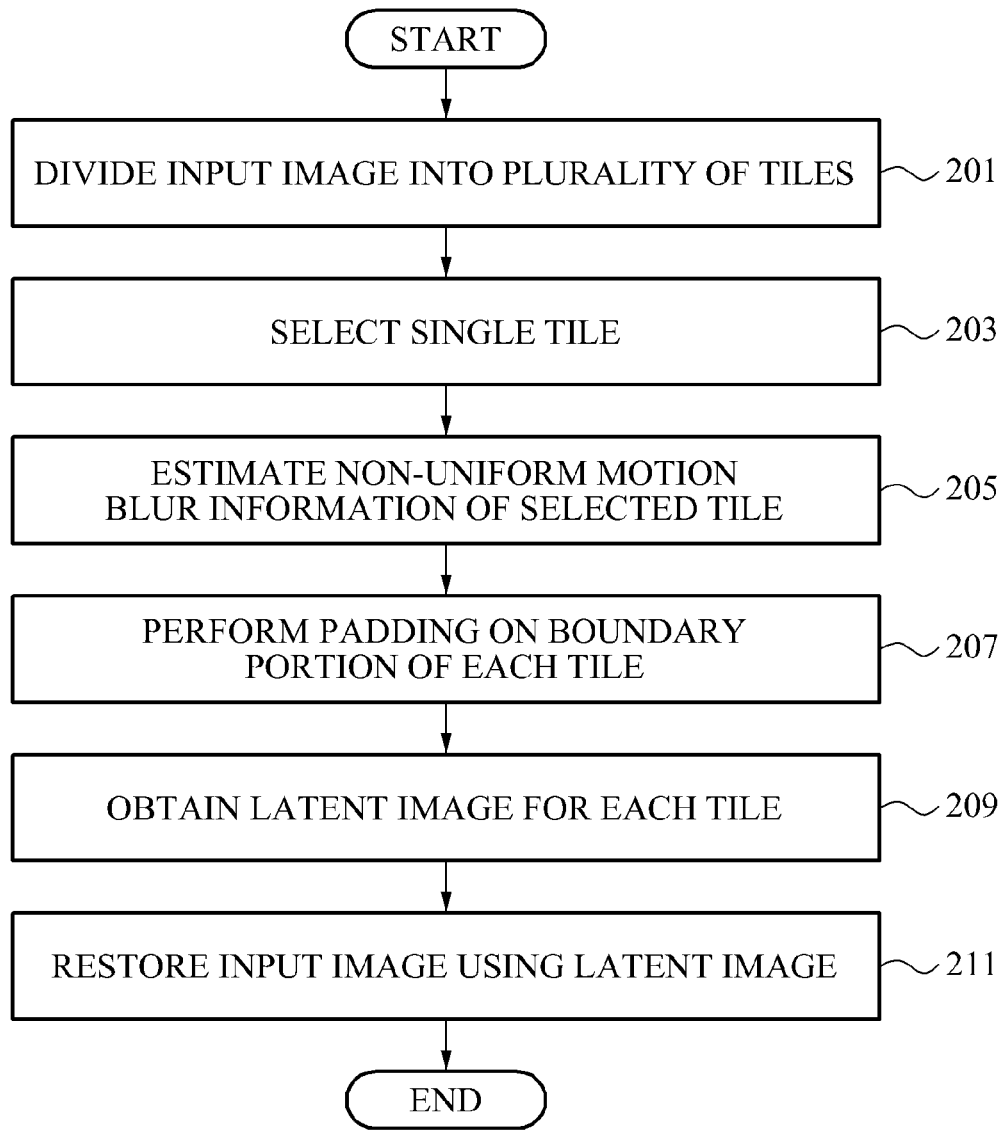
FIG. 2 illustrates a method of deblurring a non-uniform motion blur in a large scale image based on a tile unit according to example embodiments.

FIG. 2 illustrates a method of deblurring a non-uniform motion blur in a large scale image based on a tile unit according to example embodiments.

In operation 201, an apparatus for deblurring a non-uniform motion blur, hereinafter a deblurring apparatus, may divide an input image into a plurality of tiles having a predetermined size.

Here, the input image may include a relatively large input image having a size greater than or equal to 10 megapixels.

The input image may correspond to any one or more of a single frame including non-uniform motion blur, a multi-frame including non-uniform motion blur, and a multi-frame including a single blurred image including non-uniform motion blur and a single noise image in which a blur is absent, or any combination thereof.

In operation 203, the deblurred apparatus may select a single tile from the plurality of tiles.

The deblurring apparatus may generate a gradient histogram for each of the plurality of tiles, based on a direction of edge pixels, included in each of the plurality of tiles, classified based on a number of the edge pixels and a gradient direction of the edge pixels. The deblurring apparatus may select a single tile based on the generated gradient histogram. In this instance, the selected single tile may correspond to an optimal tile suitable for estimating non-uniform motion blur information with respect to the input image. Here, the gradient direction may include any one of an up and down direction, a left and right direction, a diagonal direction, and another diagonal direction vertical to the diagonal direction. A method of selecting the single tile by the deblurring apparatus will be described in detail with reference to FIG. 3.

In operation 205, the deblurring apparatus may estimate non-uniform motion blur information of the selected single tile by performing image registration.

In operation 207, the deblurring apparatus may perform padding on a boundary portion of each of the plurality of tiles. A method of performing the padding will be described in detail with reference to FIG. 4.

In operation 209, the deblurring apparatus may obtain a latent image for each of the plurality of tiles, by deblurring a non-uniform motion blur based on the estimated non-uniform motion blur information. The deblurring apparatus may correct the estimated non-uniform motion blur information to match pixel coordinates corresponding to a relevant position in the input image. The deblurring apparatus may deblur the non-uniform motion blur, using the corrected non-uniform motion blur information as non-uniform motion blur information for each of the plurality of tiles.

When padding is performed, the deblurring apparatus may obtain latent images by deblurring the non-uniform motion blur in each of the plurality of tiles having a size expanded by a size of the pad to be added.

In this instance, the deblurring apparatus may obtain a latent image by deblurring the non-uniform motion blur using different schemes depending on a type of the input image. That is, when the input image corresponds to one of the single frame including the non-uniform motion blur and the multi-frame including the non-uniform motion blur, the deblurring apparatus may obtain the latent image, by deblurring the non-uniform motion blur using a conjugate gradient method. Conversely, when the input image corresponds to the multi-frame including the single blurred image including the non-uniform motion blue and the single noise image in which the blur is absent, the deblurring apparatus may obtain the latent image, by deblurring the non-uniform motion blur, using the RL deconvolution algorithm.

In operation 211, the deblurring apparatus may restore the input image by combining the latent images with respect to the plurality of tiles.

Figure 3:
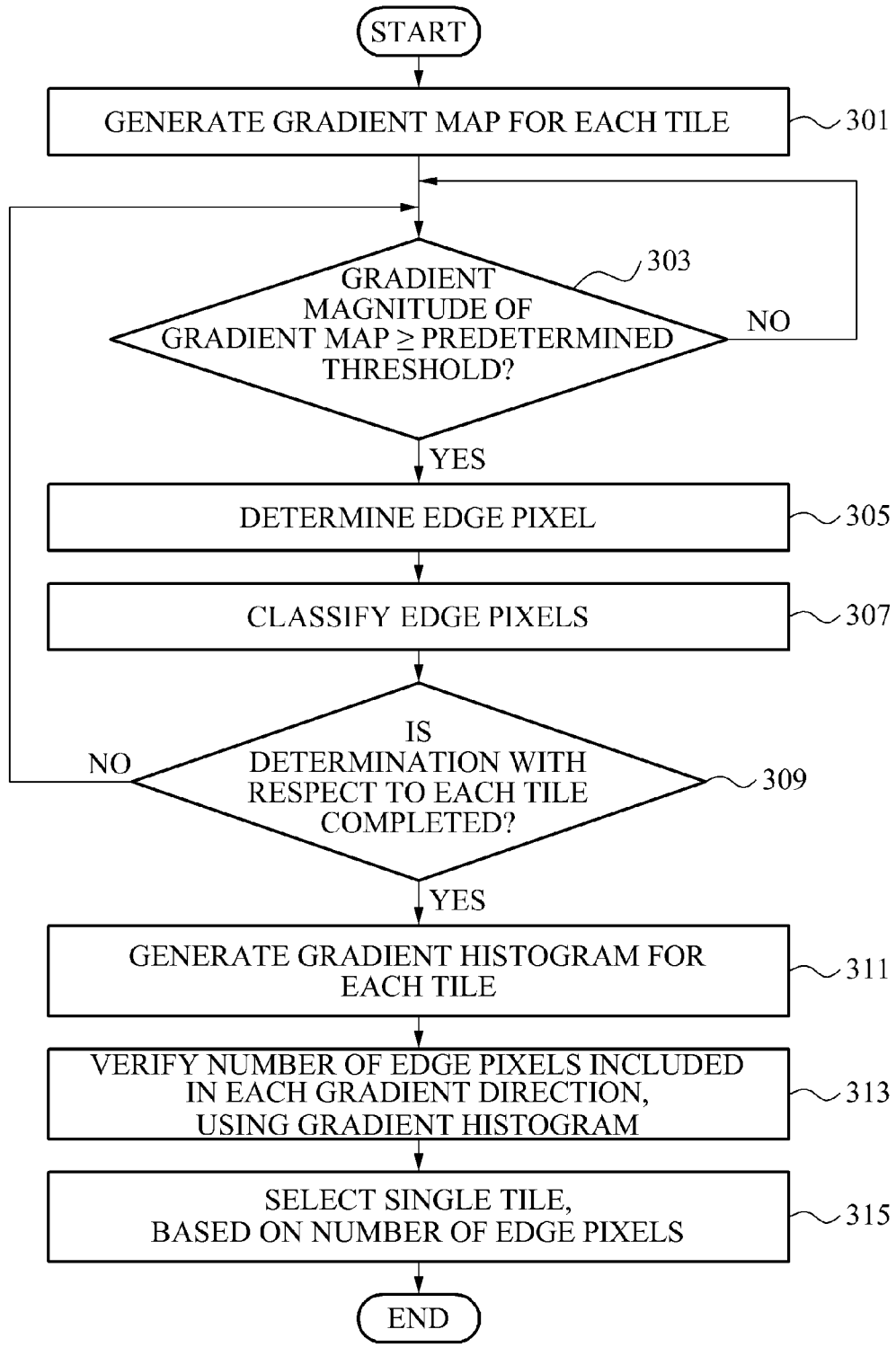
FIG. 3 illustrates a method of selecting a single tile in a method of deblurring a non-uniform motion blur in an input image according to example embodiments.

FIG. 3 illustrates a method of selecting a single tile in a method of deblurring a non-uniform motion blur in an input image according to example embodiments.

In operation 301, an apparatus for deblurring a non-uniform motion blur, hereinafter a deblurring apparatus, may generate a gradient map for each of a plurality of tiles.

The deblurring apparatus may determine edge pixels, based on a gradient magnitude of the gradient map. In particular, in operation 303, the deblurring apparatus may determine whether the gradient magnitude of the gradient map for pixels is greater than or equal to a predetermined threshold.

In operation 305, the deblurring apparatus may determine, pixels for which a gradient magnitude of a gradient map is greater than or equal to the predetermined threshold to be edge pixels. When the gradient magnitude of the gradient map with respect to the pixels is less than the predetermined threshold, the deblurring apparatus may return to the operation 303, and may wait until the gradient magnitude of the gradient map for the pixels is greater than or equal to the predetermined threshold.

In operation 307, the deblurring apparatus may classify the edge pixels based on a gradient direction. Here, the gradient direction may include any one of an up and down direction, a left and right direction, a diagonal direction, and another diagonal direction perpendicular to the diagonal direction.

In operation 309, the deblurring apparatus may determine whether determination with respect to each of the plurality of tiles has been completed. That is, the deblurring apparatus may perform the operation 303 when the determination of the edge pixels based on the gradient magnitude of the gradient map with respect to all of the plurality of tiles is yet to be completed. Conversely, when the determination of the edge pixels with respect to each of the plurality of pixels has been completed, the deblurring apparatus may generate a gradient histogram for each of the plurality of pixels, based on the classified edge pixels, in operation 311.

In operation 313, the deblurring apparatus may verify a number of edge pixels included in each gradient direction, with respect to each of the plurality of pixels, using the generated gradient histogram for each of the plurality of tiles.

In operation 315, the deblurring apparatus may select a single tile, based on the number of pixels included in each gradient direction. According to example embodiments, by selecting an area, such as a tile, in which a great number of edge pixels are included in various directions to be an optimal tile suitable for estimating the non-uniform motion blur information, accuracy for the estimation of the non-uniform motion blur information may be increased, and a clearer image may be restored.

Figure 4:
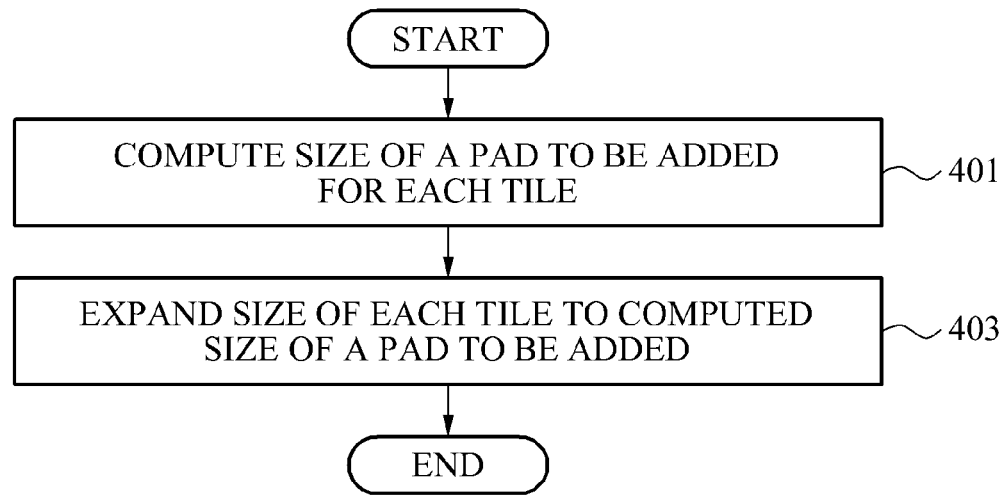
FIG. 4 illustrates a method of performing padding in a method of deblurring a non-uniform motion blur in an input image according to example embodiments.

FIG. 4 illustrates a method of performing padding in a method of deblurring a non-uniform motion blur in an input image according to example embodiments.

In operation 401, an apparatus for deblurring a non-uniform motion blur, hereinafter a deblurring apparatus, may compute a size of the pad to be added with respect to each of a plurality of tiles, based on the non-uniform motion blur information estimated in operation 205 of FIG. 2, and positional information of a pixel corresponding to each of the plurality of tiles. Here, the size of the pad to be added for each of the plurality of tiles may be computed, based on a pixel distance by which pixels constituting each of the plurality of tiles may be displaced due to a blur. For example, the size of the pad to be added for each of the plurality of tiles may be determined based on a maximum pixel distance by which the pixels may be displaced due to a blur.

In operation 403, the deblurring apparatus may perform padding by expanding a size of each of the plurality of tiles by the computed size of the pad to be added.

When the padding is performed, the deblurring apparatus may obtain latent images, by deblurring a non-uniform motion blur in each of the plurality of tiles having the size expanded by the computed size of the pad to be added.

Figure 5:
FIG. 5 illustrates an input blurred image including a non-uniform motion blur according to example embodiments.
Figure 6:
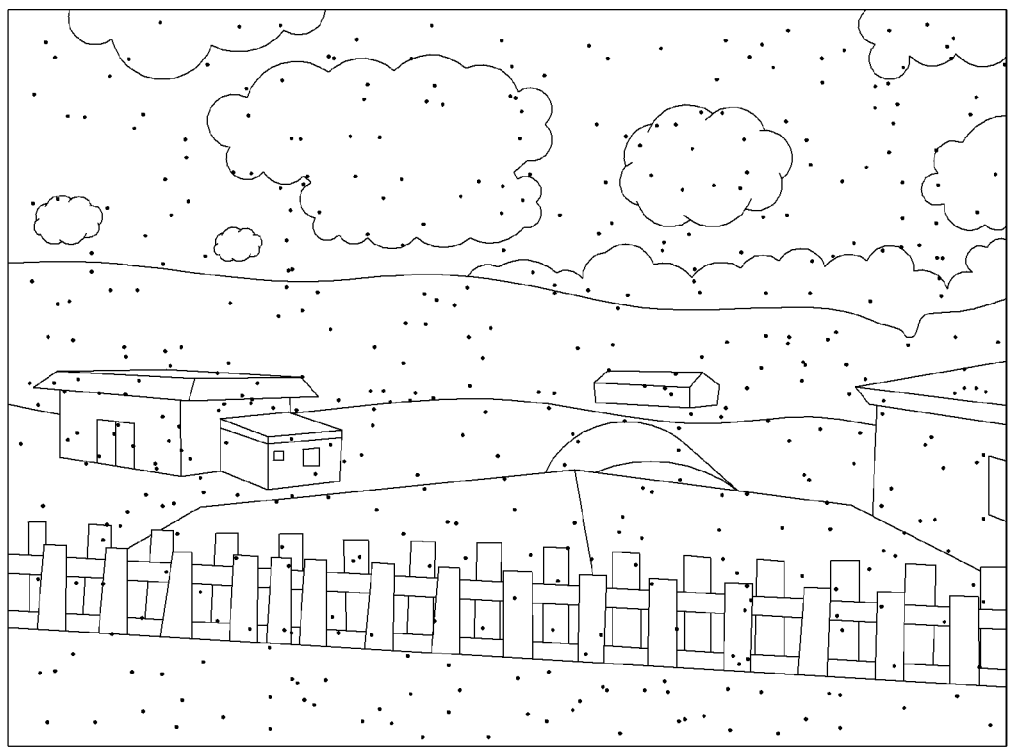
FIG. 6 illustrates an input noise image in which a blur is absent according to example embodiments.

FIG. 5 illustrates an input blurred image including a non-uniform motion blur according to example embodiments, and FIG. 6 illustrates an input noise image in which a blur is absent according to example embodiments. FIGS. 5 and 6 show an example of an input image, that is, a multi-frame including a single blurred image including a non-uniform motion blur and a single noise image in which a blur is absent.

FIG. 7 illustrates a result of deblurring a blur without performing padding in a method of deblurring a non-uniform motion blur in an input image according to example embodiments, and FIG. 8 illustrates a result of deblurring a blur by performing padding in a method of deblurring a non-uniform motion blur in an input image according to example embodiments.

FIGS. 7 and 8 illustrate a final image that is deblurred using estimated non-uniform motion blur information. In particular, FIG. 7 shows a result when padding for removing an artifact in an outer portion of a tile has yet to be performed, and FIG. 8 shows a result of performing the padding. It may be understood that the artifact in the outer portion of the tile may be removed effectively when the padding is performed as shown in FIG. 8.

FIG. 9 illustrates an apparatus 900 for deblurring a non-uniform motion blur in a large scale image based on a tile unit according to example embodiments.

Referring to FIG. 9, the deblurring apparatus 900 may include, for example, a dividing unit 910, a selecting unit 920, an estimating unit 930, a padding performing unit 940, an obtaining unit 950, and a restoring unit 960.

The dividing unit 910 may divide an input image into a plurality of tiles having a predetermined size. In this instance, the input image may include an image having a relatively high resolution such as a resolution greater than or equal to 10 megapixels.

The selecting unit 920 may select a single tile from the plurality of tiles.

The selecting unit 920 may include a generating device 921, and a selecting device 925.

The generating device 921 may generate a gradient histogram for each of the plurality of tiles, based on a direction of edge pixels included in each of the plurality of tiles, the edge pixels being classified based on a quantity of the edge pixels and a gradient direction of the edge pixels.

The selecting device 925 may select a single tile using the generated gradient histogram.

The estimating unit 930 may estimate non-uniform motion blur information of the selected single tile by performing image registration.

The padding performing unit 940 may perform padding on a boundary portion of each of the plurality of tiles. The padding may be performed to remove an artifact in the boundary portion of each of the plurality of tiles.

The padding performing unit 940 may include a computing device 941 and an expanding device 945.

The computing device 941 may compute a size of the pad to be added for each of the plurality of tiles, using the estimated non-uniform motion blur information and positional information of a pixel corresponding to each of the plurality of tiles.

The expanding device 945 may expand a size of the plurality of tiles to the computed size of the pad to be added.

The obtaining unit 950 may obtain a latent image for each of the plurality of tiles, by deblurring a non-uniform motion blur with respect to each of the plurality of tiles, based on the estimated non-uniform motion blur information of the single tile selected as an optimal tile. The obtaining unit 950 may include a correcting device 951, and a deblurring device 955.

The obtaining unit 950 may obtain latent images by deblurring a non-uniform motion blur in each of the plurality of tiles having the size expanded by the size of the pad to be added.

The correcting device 951 may correct the estimated non-uniform motion blur information to match pixel coordinates corresponding to a relevant position in the input image.

The deblurring device 955 may deblur the non-uniform motion blur, using the corrected non-uniform motion blur information as non-uniform motion blur information for each of the plurality of tiles.

The input image may correspond to any one or more of a single frame including the non-uniform motion blur, a multi-frame including the non-uniform motion blur, and a multi-frame including a single blurred image including the non-uniform motion blur and a single noise image in which a blur is absent, or any combination thereof.

The deblurring apparatus 900 may obtain a latent image, by deblurring the non-uniform motion blur using different schemes depending on a type of the input image.

The restoring unit 960 may restore the input image using the latent image with respect to the plurality of tiles.

According to example embodiments, a relatively large input image may be deblurred by dividing the relatively large input image into partial areas in tile units, whereby a limitation of a capacity of a storage space used for processing large scale images may be overcome.

According to example embodiments, an optimal tile with respect to a partial area most suitable for estimating non-uniform motion blur information may be selected from tiles divided from a large scale image, whereby deblurring with respect to the large scale image may be readily performed.

According to example embodiments, padding may be performed on a tile to have a size marginally greater than a predetermined size of the tile, whereby an artifact in an outer portion of the tile, occurring when a non-uniform motion blur is deblurred based on a tile unit, may be effectively removed and simultaneously, a clearer image may be restored.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for deblurring a non-uniform motion blur in an input image described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of deblurring an input image, the method comprising:
   selecting a single tile from a plurality of tiles of the input image;
   estimating first non-uniform motion blur information with respect to the input image, based on the single tile;
   estimating second non-uniform motion blur information with respect to the plurality of tiles, based on the first non-uniform motion blur information;
   obtaining latent images for the plurality of tiles, based on the second non-uniform motion blur information; and
   restoring the input image using the latent images for the plurality of tiles.

2. The method of claim 1, wherein
   the estimating of the first non-uniform motion blur information, the estimating of the second non-uniform motion blur information, and obtaining of the latent images for the plurality of tiles are performed iteratively to compute an optimized latent image and non-uniform motion blur information corresponding to the optimized latent image.

3. The method of claim 1, wherein the selecting of the single tile comprises:
   generating gradient histograms for the plurality of tiles based on directions of edge pixels, included in the plurality of tiles, the edge pixels being classified based on a quantity of the edge pixels and a gradient direction of the edge pixels; and
   selecting the single tile using the generated gradient histograms.

4. The method of claim 3, wherein the generating of the gradient histograms comprises:
   generating a gradient map for plurality of tiles;
   determining edge pixels based on a gradient magnitude of the gradient map;
   classifying the determined edge pixels based on the gradient direction; and
   generating the gradient histograms for the plurality of tiles based on the classified edge pixels.

5. The method of claim 4, wherein the selecting comprises:
   verifying a number of edge pixels included in the gradient direction, with respect to each of the plurality of tiles, using the generated gradient histograms; and
   selecting the single tile based on the verified number of edge pixels.

6. The method of claim 1, wherein the estimating the second non-uniform motion blur information comprises
   correcting the first non-uniform motion blur information to match pixel coordinates corresponding to a relevant position in the input image.

7. The method of claim 1, wherein the input image corresponds to at least one of a single frame comprising a non-uniform motion blur, a multi-frame comprising the non-uniform motion blur, and a multi-frame comprising a single blurred image comprising the non-uniform motion blur and a single noise image in which a blur is absent.

8. The method of claim 7, wherein the obtaining comprises deblurring the non-uniform motion blur using a conjugate gradient method when the input image corresponds to one of the single frame comprising the non-uniform motion blur and the multi-frame comprising the non-uniform motion blur.

9. The method of claim 7, wherein the obtaining comprises deblurring the non-uniform motion blur using the Richardson-Lucy (RL) deconvolution algorithm when the input image corresponds to the multi-frame comprising the single blurred image comprising the non-uniform motion blur and the single noise image in which the blur is absent.

10. The method of claim 1, further comprising:
    performing padding on a boundary portions of the plurality of tiles.

11. The method of claim 10, wherein the performing of the padding comprises:
    computing a size of a pad to be added for the plurality of tiles, based on the first non-uniform motion blur information and positional information of pixels corresponding to the plurality of tiles; and
    expanding a sizes of the plurality of tiles by the computed size of the pad to be added.

12. The method of claim 11, wherein the size of the pad to be added is computed based on a pixel distance by which pixels constituting the plurality of tiles are displaced due to a blur.

13. The method of claim 11, wherein the obtaining of the latent images comprises obtaining the latent images by deblurring a non-uniform motion blur in the plurality of tiles for which size has been expanded by the size of the pad to be added.

14. A non-transitory computer-readable medium comprising a program for instructing a computer to perform the method of claim 1.

15. An apparatus for deblurring an input image, the apparatus comprising:
    a selector to select a single tile from a plurality of tiles of the input image;
    a first estimator to estimate first non-uniform motion blur information with respect to the input image, based on the single tile;
    a second estimator to estimate second non-uniform motion blur information with respect to the plurality of tiles, based on the first non-uniform motion blur information;
    an obtainer to obtain latent images for the plurality of tiles, based on the second non-uniform motion blur information and
    a restorer to restore the input image using the latent images for the plurality of tiles.

16. The apparatus of claim 15, wherein the selector comprises:
    a generator to generate gradient histograms for the plurality of tiles based on a direction of edge pixels, included in the plurality of tiles, the edge pixels being classified based on a quantity of the edge pixels and a gradient direction of the edge pixels; and
    a selector to select the single tile using the generated gradient histograms.

17. The apparatus of claim 15, wherein the second estimator comprises:
    a corrector to correct the first non-uniform motion blur information to match pixel coordinates corresponding to a relevant position in the input image.

18. The apparatus of claim 15, wherein the input image corresponds to at least one of a single frame comprising a non-uniform motion blur, a multi-frame comprising the non-uniform motion blur, and a multi-frame comprising a single blurred image comprising the non-uniform motion blur and a single noise image in which a blur is absent.

19. The apparatus of claim 15, further comprising:
    a padder to perform padding on a boundary portions of the plurality of tiles.

20. The apparatus of claim 19, wherein the padder comprises:
    a compute to compute a size of a pad to be added for the plurality of tiles, based on the first non-uniform motion blur information and positional information of a pixel corresponding to the plurality of tiles; and an expander to expand sizes of the plurality of tiles by the computed size of the pad to be added.

21. The apparatus of claim 19, wherein the obtainer obtains the latent images by deblurring a non-uniform motion blur in each of the plurality of tiles of which size has been expanded by the size of the pad to be added.

22. The apparatus of claim 15, further comprising:

a divider to divide the input image into the plurality of tiles and wherein the plurality of tiles have a predetermined size.

23. A method of deblurring an input image, the method comprising:

estimating first non-uniform motion blur information with respect to the input image, by performing image registration on single tile of a plurality of tiles of the input image;

estimating second non-uniform motion blur information with respect to the plurality of tiles, based on the first non-uniform motion blur information; and obtaining latent images for the plurality of tiles, by deblurring a non-uniform motion blur of the input image based on the second non-uniform motion blur information.

24. The method of claim 23 further comprising:

performing padding on boundary portions of the plurality of tiles based on the first non-uniform motion blur information and positional information of pixels corresponding to the plurality of tiles.

* * * * *

UNITED STATES PATENT AND TRADEMARK OFFICE
CERTIFICATE OF CORRECTION

| | | |
|---|---|---|
| PATENT NO. | : 9,042,673 B2 | Page 1 of 1 |
| APPLICATION NO. | : 13/793319 | |
| DATED | : May 26, 2015 | |
| INVENTOR(S) | : Jung Uk Cho et al. | |

It is certified that error appears in the above-identified patent and that said Letters Patent is hereby corrected as shown below:

In the claims

Claim 4, Column 17, Line 35

After "for" insert --the--.

Claim 10, Column 18, Line 4

After "on" delete "a".

Claim 11, Column 18, Line 12

After "expanding" delete "a".

Claim 15, Column 18, Lines 37-38

Delete "information" and insert --information;--, therefor.

Claim 20, Column 18, Line 66

Delete "compute" and insert --computer--, therefor.

Signed and Sealed this
Thirteenth Day of October, 2015

Michelle K. Lee
*Director of the United States Patent and Trademark Office*